United States Patent [19]

Miller et al.

[11] Patent Number: 5,204,194

[45] Date of Patent: Apr. 20, 1993

[54] MULTICELL BATTERY HAVING A TAB-FUSE FOR OVERCURRENT INTERRUPTION

[75] Inventors: Ted J. Miller; Dean P. Stanley; Kent A. Snyder, all of Fort Wayne, Ind.

[73] Assignee: Magnavox Electronic Systems Company, Fort Wayne, Ind.

[21] Appl. No.: 886,205

[22] Filed: May 21, 1992

[51] Int. Cl.[5] .............................................. H01M 2/00
[52] U.S. Cl. ............................................. 429/7; 429/61; 429/158; 429/160
[58] Field of Search .................... 429/60, 61, 62, 65, 429/7, 160, 158; 337/142, 401, 416, 290, 295; 169/42

[56] References Cited

U.S. PATENT DOCUMENTS

| | | | |
|---|---|---|---|
| 418,701 | 1/1890 | Dey | 429/62 X |
| 4,011,366 | 3/1977 | Bones et al. | 429/61 |
| 4,188,460 | 2/1980 | Kang et al. | 429/7 |
| 4,209,571 | 6/1980 | Bessett et al. | 429/62 X |
| 4,497,879 | 2/1985 | Lucke et al. | 429/62 |
| 4,879,187 | 11/1989 | Biegger | 429/7 |

Primary Examiner—Anthony Skapars
Attorney, Agent, or Firm—John H. Crozier; Richard T. Seeger

[57] ABSTRACT

In a preferred embodiment, a tab-fuse for connecting two adjacent cells in a multicell battery, which includes: a metallic member having a base portion for attachment to the positive end of one of the adjacent cells and a tab portion which is bendable for attachment of the distal end thereof to the negative end of the other of the adjacent cells; and the base portion and the proximal end of the tab portion being joined by a relatively narrow portion of selected width, such that the narrow portion serves as a fusible link for overcurrent protection.

5 Claims, 3 Drawing Sheets

MULTICELL BATTERY HAVING A TAB-FUSE FOR OVERCURRENT INTERRUPTION

This invention was made with Government support under Contract no. N62269-88-C-1112 awarded by the United States Navel Air Development Center, Warminster, Pa. The Government has certain rights in the invention.

BACKGROUND OF THE INVENTION

1. Field of the Invention

The present invention relates to electrical fuses generally and, more particularly, but not by way of limitation, to a novel, low-cost tab-fuse especially useful as a non-bypassable intercell overcurrent protection device for batteries.

2. Background Art

There exists a need for an overcurrent protection device for use with multicell batteries, such as lithium batteries, which device, for safety considerations, cannot be bypassed.

Any overcurrent protection device attached externally to a battery is accessible and can be bypassed, either intentionally or accidentally. Placing the overcurrent device within the battery itself has, heretofore, been impracticable because the size of conventional overcurrent devices precludes their incorporation in the battery without changing the size and/or configuration of the battery.

Accordingly, it is a principal object of the present invention to provide an overcurrent protection device for a multicell battery that can be incorporated within the battery itself without changing the size and/or configuration of the battery.

It is an addtional object of the invention to provide such an overcurrent device for a multicell battery that can be incorporated within the battery itself without changing the dimensions or spacings of individual cells within the battery.

It is a further object of the invention to provide such an overcurrent protection device that is easily and economically constructed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a tab-fuse for connecting two adjacent cells in a multicell battery, comprising: a metallic member having a base portion for attachment to the positive end of one of said adjacent cells and a tab portion which is bendable for attachment of the distal end thereof to the negative end of the other of said adjacent cells; and said base portion and the proximal end of said tab portion being joined by a relatively narrow portion of selected width, such that said narrow portion serves as a fusible link for overcurrent protection.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
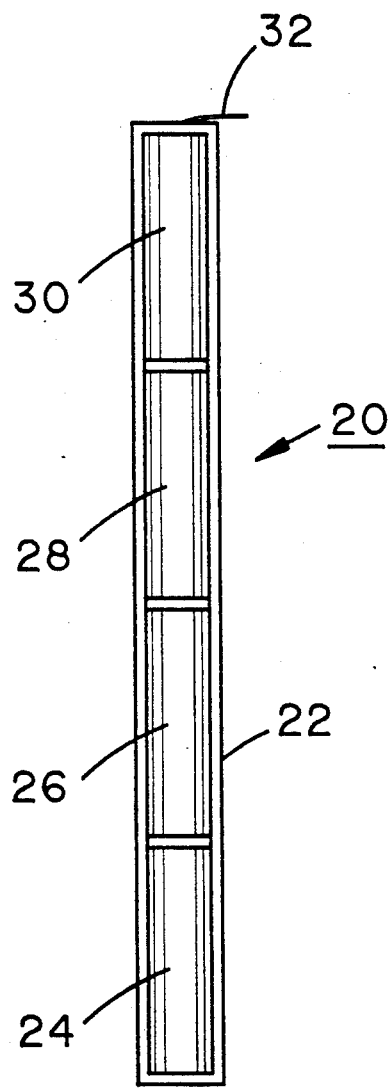
FIG. 1 is a side elevational view, cut-away, of a conventional four-cell, series-stack, lithium battery.

Reference now should be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a conventional four-cell, series-connected lithium battery, generally indicated by the reference numeral 20, having an outer, PVC, electrical insulation layer 22 surrounding cells 24, 26, 28, and 30 in end-to-end relationship, with the positive end of one cell adjacent the negative end of the next cell in the series. A positive terminal 32 extends from the top of the battery.

Figure 2:
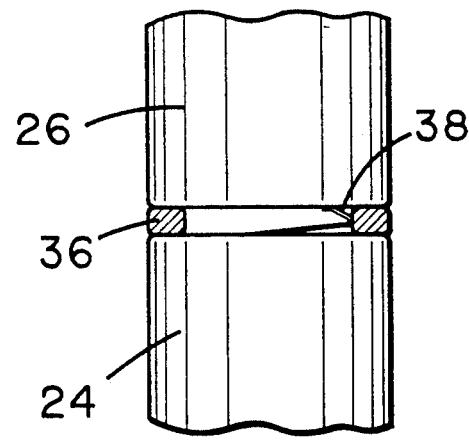
FIG. 2 is a detail showing the intercell connections of the cells of the battery of FIG. 1.
Figure 3:
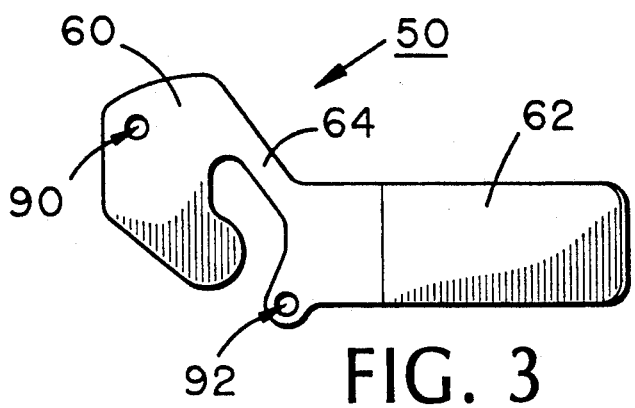
FIG. 3 is an enlarged top plan view of the fusible element of the current overprotection device of the present invention.
Figure 4:
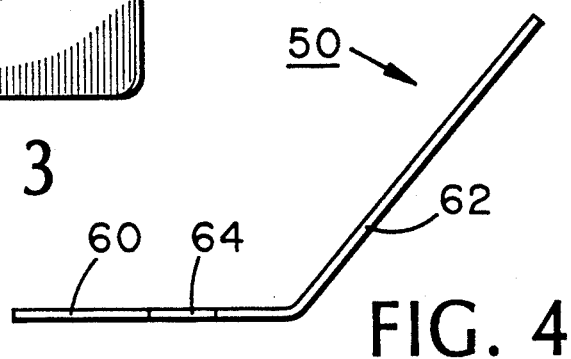
FIG. 4 is an enlarged side elevational view of the element of FIG. 3.
Figure 5:
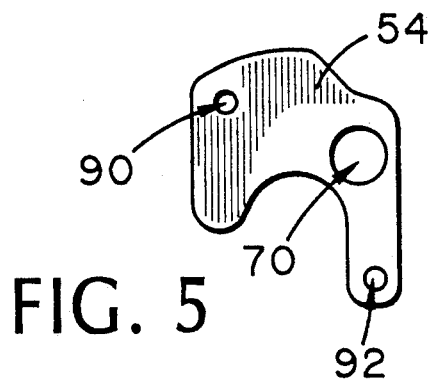
FIG. 5 is an enlarged top plan view of the top member of the device.
Figure 6:
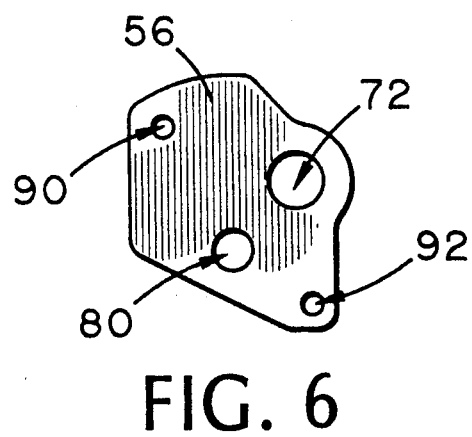
FIG. 6 is an enlarged top plan view of the bottom member of the device.
Figure 7:
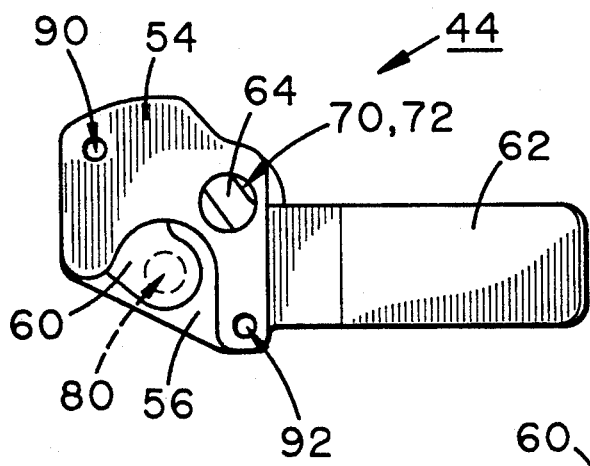
FIG. 7 is an enlarged top plan view of an assembly of the device.
Figure 8:
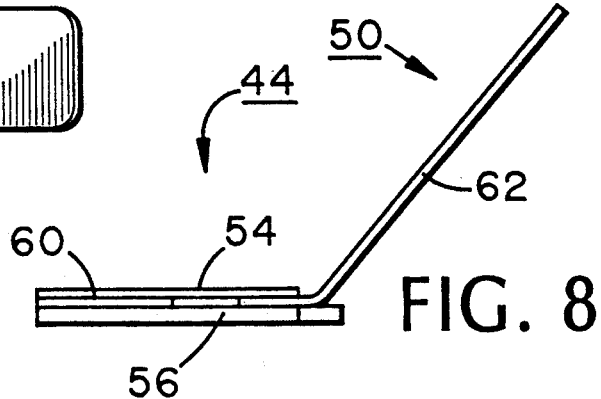
FIG. 8 is an enlarged side elevational view of the assembly of FIG. 7.

FIG. 2 illustrates the conventional method of connection of adjacent cells (connections not shown on FIG. 1), here, for illustrative purposes, cells 24 and 26. Cells 24 and 26 are spaced apart by an annular washer 36. One end of a connecting elongate nickel ribbon/tab 38 is welded to the positive end of cell 24, while the other end of the ribbon/tab is welded to the negative end of cell 26. It will be understood that other intercell connections are identical to that shown on FIG. 2.

Figure 9:
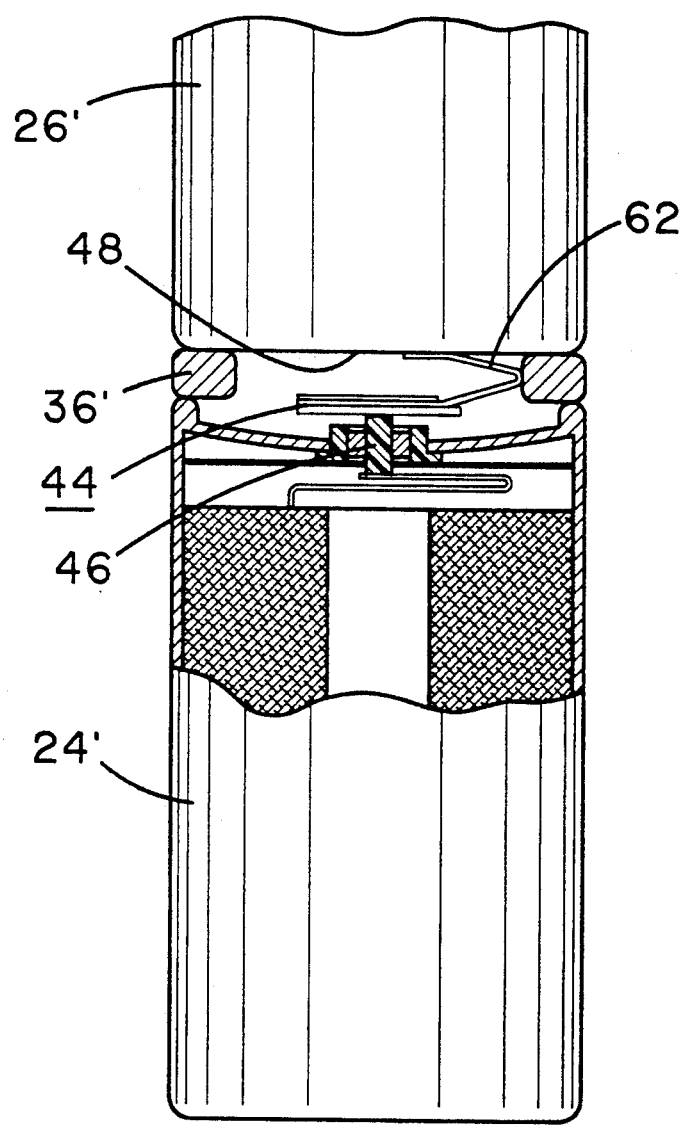
FIG. 9 is an enlarged side elevational view, partially cut-away and partially in cross-section, of the device of the present invention joining two cells of a battery.

Reference should now be made to FIG. 9 which illustrates battery cells 24' and 26', spaced apart by an annular washer 36', and electrically joined by an overcurrent protection device, or tab-fuse, generally indicated by the reference numeral 44, which is constructed according to the present invention. First, tab-fuse 44 is welded to a conventional post 46 disposed at the positive end of cell 24'. Then, the positive end of cell 24' is conventionally filled with an epoxy material (not shown) up to and covering the horizontal portion of tab-fuse 44 for insulation and to provide support for the tab-fuse. After the expoxy cures, tab-fuse 44 is welded to the negative base 48 of cell 26'.

Reference should now be made to FIGS. 3-8 together for an understanding of the details of the construction of tab-fuse 44. Tab-fuse 44 includes a planar metallic member, generally indicated by the reference numeral 50 (FIGS. 3 and 4), disposed between planar upper and lower insulating members 54 (FIG. 5) and 56 (FIG. 6), respectively.

Metallic member 50 has a base portion 60 and a tab portion 62 joined by a relatively narrow fusible portion 64. When tab-fuse 44 is assembled (FIG. 7), fusible portion 64 extends across congruently disposed circular openings 70 and 72 formed, respectively, in upper and lower insulating members 54 and 56, the openings being provided to expose the fusible portion to assure the consistency of fusing of the fusible portion. Openings 70 and 72 are covered with high temperature tape (not shown) to prevent epoxy from flowing onto fusible portion 64.

Lower insulating member 56 includes formed therein an opening 80 into which the top of post 46 (FIG. 9) is inserted so that base portion 60 of metallic member 50 may be welded to the post.

Prior to assembly, tab portion 62 of tab-fuse 44 is given a preliminary upward bend from the primary plane of the tab-fuse and when installed (FIG. 9), the tab portion is further bent so that the distal end thereof will engage bottom 48 of cell 26' to be welded thereto.

To construct tab-fuse 44, upper and lower insulating members 54 and 56 are die cut from, respectively, 0.020-inch-thick and 0.031-inch-thick "FR-4" epoxy-glass laminate, "MIL-P-13939/4, Type GFN". Metallic member 50 is die cut from 0.008-inch-thick nickel sheet, Alloy 200, fully annealed. The width of fusible portion 64 is about 0.120 inch for a 60-amp, pulse-power lithium battery application. A pressure sensitive transfer adhesive furnished by 3M as "Type 9469" is applied with a release liner to the lower surface of upper insulating member 54 and to the upper surface of lower insulating member 56.

The elements 50, 54 and 56 of tab-fuse 44 are inserted in a simple fixture (not shown) and aligned by means of pins in the fixture being inserted in openings 90 and 92 formed in each of the elements. The elements 50, 54, and 56 are then pressed together by the fixture to set the pressure sensitive adhesive.

During normal operation, fusible portion 64 of metallic member 50 acts as an electrical interconnection, permitting current flow through tab-fuse 44 with a minimum of electrical resistance, or voltage loss. In the event of excessive circuit current flow (short circuit or near short circuit conditions), tab-fuse 44 acts as a current limiting device by opening, due to excess heating and eventual melting of fusible portion 64. As an application driven device, tab-fuse 44 is optimized for maximum overcurrent sensitivity/protection and minimal voltage loss through the device. Time-current and voltage drop characteristics are well known in the art and tab-fuse 44 can easily be redesigned for other applications.

Tab-fuse 44 as described above is easily and economically constructed and has the further benefit of replacing, one-for-one, existing nickel ribbon/tab 38 (FIG. 2), while also providing overcurrent protection, within existing package dimensions. The planar design of tab-fuse 44 allows for complete integration within battery 20 (FIG. 1), resulting in no change, or increase, in dimensions of either the battery or individual cells therein. Cells with tab-fuse 44 are dimensionally identical to unfused cells. Currently commercially available fuses with applicable current ratings are both too large volumetrically, by orders of magnitude, and have prohibitive configuration geometries which prevent integration into the existing battery dimensions.

Manufacturing tooling costs for tab-fuse 44 are insignificant in comparison with either metal-in-glass or molded plastic-bodied fuses. Required tooling is minimal both in complexity and quantity. Additionally, since tab-fuse 44 utilizes the actual existing intercell tab connection material as the fusible element, and since all other materials used to fabricate the tab-fuse are readily available commercially for other industrial applications, material costs for the tab-fuse are insignificant when compared with existing commercial fuse designs.

The geometric profile of fusible portion 64 of tab-fuse 44 provides an optimized balance between the voltage losses through the tab-fuse and the current sensitivity of the fuse circuit-opening action, or overcurrent protection. This optimization is possible, since the continuous metallic member 50 of tab-fuse 44 is itself the intercell connection. This represents a significant advantage over the use of any currently commercially available fuses which would not be optimized for both voltage losses and current sensitivity within the necessary voltage-current range of operation and which would be utilized as discrete components in addition to the tab itself.

The continuous nature of metallic member 50 as both a non-discrete fuse and a non-discrete tab results in a reduction in manufacturing costs and complexity for the cell/battery manufacturer. One or more welding, soldering, or other joining operations per battery are eliminated over conventional fused batteries which include discrete fuse devices.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. A multicell battery, comprising:
    (a) at least first and second battery cells disposed in end-to-end relationship; and
    (b) a tab-fuse for connecting said first and second battery cells, said tab-fuse comprising:
        (i) a metallic member having a base portion for attachment to the positive end of one of said first and second battery cells and a tab portion which is bendable for attachment of the distal end thereof to the negative end of the other of said first and second battery cells; and
        (ii) said base portion and the proximal end of said tab portion being joined by a relatively narrow portion of selected width, such that said narrow portion serves as a fusible link for overcurrent protection.

2. A battery, as defined in claim 1, wherein said distal end of said tab portion is welded to said negative end and said base portion is welded to a post extending from said positive end.

3. A battery, as defined in claim 2, wherein said tab-fuse further comprises:
    (a) upper and lower insulating members disposed, respectively, against and substantially covering the upper and lower surfaces of said base portion of said metallic member; and (b) said lower insulating member having formed therein an opening such that the top of said post may be inserted therein for welding said post to said base portion.

4. A battery, as defined in claim 3, wherein said upper and lower insulating members have formed therein congruently disposed openings such that a substantial area of said narrow portion of said metallic member is visible therein.

5. A battery, as defined in claim 1, wherein the dimensions of said battery are identical to what they would be if said first and second battery cells were electrically joined by conventional means.

* * * * *